Aug. 31, 1965   R. E. DUNAWAY   3,203,040
CLAMP FOR SKINS AND PELTS

Filed July 31, 1962   2 Sheets-Sheet 1

INVENTOR.
ROBERT E. DUNAWAY

ATTY
R. G. Story

Aug. 31, 1965   R. E. DUNAWAY   3,203,040
CLAMP FOR SKINS AND PELTS
Filed July 31, 1962   2 Sheets-Sheet 2

INVENTOR.
ROBERT E. DUNAWAY

Atty

R. G. Story

United States Patent Office 3,203,040
Patented Aug. 31, 1965

3,203,040
CLAMP FOR SKINS AND PELTS
Robert E. Dunaway, Nashville, Tenn., assignor to Swift & Company, Chicago, Ill., a corporation of Illinois
Filed July 31, 1962, Ser. No. 213,644
4 Claims. (Cl. 17—21)

This invention relates to the art of skinning an animal carcass in a slaughtering operation. More specifically, the present invention is directed to an improved hide stripping apparatus including a clamp device for gripping the skin or pelt of an animal carcass while the pelt is pulled from the carcass.

In the processing of animal carcasses in a packinghouse or the like, it becomes necessary at some point in the operation to remove the skin of the animal. This is normally done by making certain cuts and incisions in the skin and carcass and subsequently peeling the skin therefrom. In some instances, the skin has been peeled by hand. More recently, however, it has been a common practice to only start the peeling by hand and then hold a portion of the skin while either the animal carcass is mechanically pulled therefrom or the carcass is held stationary and the skin is gripped, mechanically, and pulled away from the carcass.

Heretofore, the means for gripping the skin has been distinct and different in each of the two mentioned types of mechanical skin pulling operations. Moreover each type is best utilized on different classes of animals; and both means for holding the skin are often found in the same packinghouse. For example, with smaller animals such as sheep and lambs it is more advantageous to pull the carcass from the skin. On the other hand, with larger animals such as calves it is more advantageous to hold the animal stationary and pull the skin therefrom. Each type of operation has required different means for gripping the skin of an animal.

Accordingly, it is a primary objective of the present invention to provide an improved clamp device which may be utilized in either of the two above-noted types of skin pulling operations.

It is a further object of the invention to provide an improved clamp device for gripping the skin or pelt of an animal carcass in such a manner that as the pelt is stripped from the carcass the gripping force will be increased, yet the pelt may be removed from the clamp with ease once it is stripped from the carcass.

Basically, the present invention comprises a clamp device having a pair of pivotal gripping means that are movable toward engagement with a pair of relatively fixed (with respect to the pivotal means) members. Portions of an animal skin may be inserted between each pivotal means and fixed member and will be gripped thereby. Tension upon the skin in a direction away from the clamp device will cause the grip to be tightened, whereas the skin may readily be removed therefrom by pulling in an opposite direction. The clamp device is equally applicable to hide-stripping systems wherein the hide is gripped at a stationary point and the carcass removed therefrom, or where the carcass is held stationary and the gripped hide is pulled therefrom.

Further objects and advantages will become apparent upon reading the following specification in conjunction with the drawings wherein.

Figure 1:
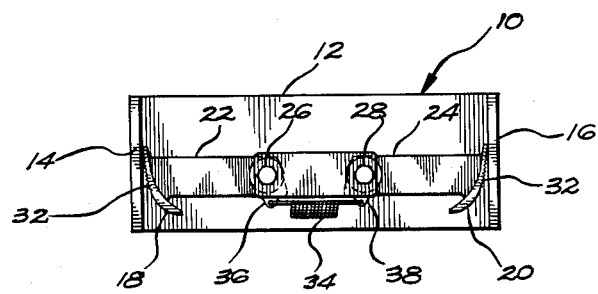
FIGURE 1 is a plan view of the improved clamp device.
Figure 2:
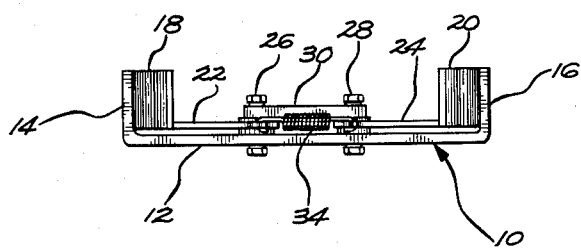
FIGURE 2 is an elevation view of the device shown in FIGURE 1.
Figure 5:
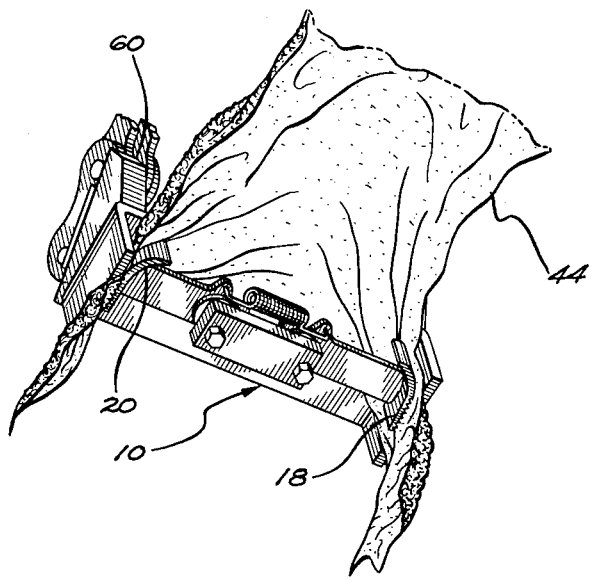
FIGURE 5 is a perspective view of the clamp device gripping a skin.

Referring in particular to FIGURES 1, 2 and 5, it may be seen that the improved clamp generally 10 comprises a substantially rectangular back plate 12 having a pair of fixed gripping members in the form of upstanding edges 14 and 16 at opposite ends thereof. A pair of movable gripping means in the form of arcuate shoes 18 and 20 are pivotally mounted on the back plate 12. Each of the arcuate shoes 18 and 20 is mounted on respective arms 22, 24, extending in opposite directions from the central portion of the back plate 12.

Each arm 22, 24 is pivotable in a plane parallel to the back plate 12, about respective pivot pins 26, 28 which extend through the arms between the back plate 12 and a face plate 30.

Each of the arcuate shoes 18, 20 is disposed with a convex surface toward each respective upstanding edge 14, 16. The convex surfaces of the arcuate shoes are serrated at 32 to provide an efficient gripping surface for holding the skins or pelts against the upright edges 14 and 16.

The position of the shoes 18 and 20 on the pivotable arms 22, 24 is such that when the arms extend at approximately 180° to one another the upper ends of the shoes (as seen in FIGURE 1) will engage the upstanding edges 14 and 16. This is the limit of movement of the arms and shoes in a downward direction (as viewed in FIGURE 1). The arms are free, however, to pivot 90° or more in an opposite, upward, direction; and the curve of the shoes 18, 20 is such that the shoes will not contact the upstanding edges when the arms are at an angle of less than about 180°.

A resilient means is connected to each of the arms 22, 24 to normally urge them in the downward direction as seen in FIGURE 1. Preferably, the resilient means takes the form of a single tension spring 34 which is connected between eyes 36, 38 on the respective arms 22, 24. Thus, the arcuate shoes 18, 20 of the clamp generally 10 are normally biased in a direction to bring them into gripping engagement with the upstanding edges 14, 16, and any item placed therebetween. Accordingly, it will be clear, upon viewing FIGURE 5, that the clamp is loaded by simply inserting portions of a skin between each of the shoes and upstanding edge members. The shoes are biased to grip the skin, and tension on the skin and in a direction away from the clamp will tend to pull the shoes into tighter gripping contact therewith. However, since the shoes and arms are free to pivot in the opposite direction, the skin may be easily removed from the clamp by pulling upwardly and outwardly therefrom.

Figure 3:
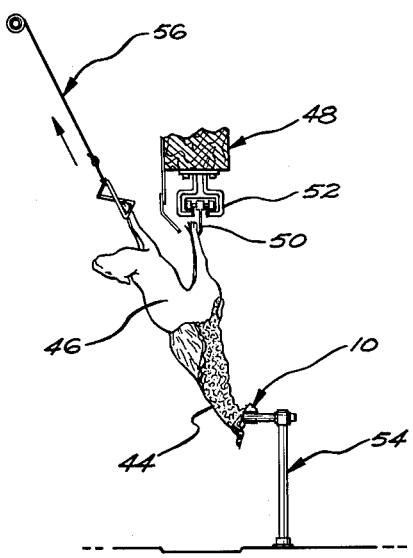
FIGURE 3 is an illustration of a skin pulling apparatus utilizing the device of FIGURES 1 and 2 wherein the animal carcass is pulled from the skin.

As illustrated in FIGURE 3, the clamp generally 10 may be utilized for removing the skin 44 from an animal carcass 46 where the animal is suspended in the usual manner by its hind legs from an overhead suspension generally 48 comprising a trolley 50 carried on an overhead track 52. In the system illustrated in FIGURE 3, the clamp generally 10 is mounted upon a stationary pedestal generally 54. In operation the skin is manually cut and loosened from the forelegs of the carcass 46 and inserted in the clamp. Thereafter the forelegs are engaged by a power hoist generally 56 and pulled upwardly so as to be stripped from the skin. This system is generally employed with smaller animals such as sheep and lambs.

Figure 4:
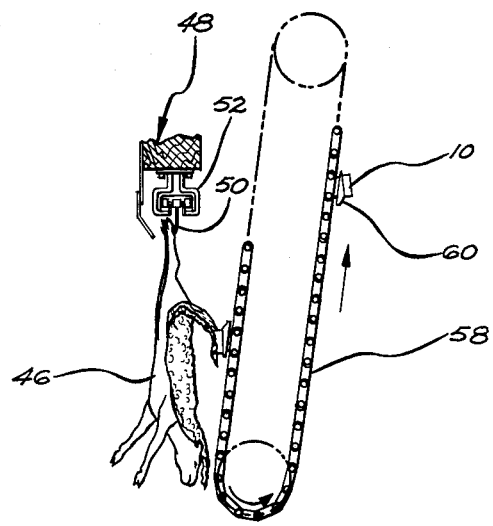
FIGURE 4 is an illustration of a skin-pulling apparatus utilizing the clamp of FIGURES 1 and 2 wherein the skin is pulled from the animal carcass.

In FIGURE 4 a skin pulling system which is often employed for calves is illustrated. In this system an animal carcass 46 is similarly supported from an overhead suspension generally 48 comprising a trolley 50 and an overhead track 52. The present clamp generally 10 is mounted between a pair of endless chains 58 disposed to run, at approximately eight degrees from vertical, adjacent the path of the animal carcass. Preferably, the clamp generally 10 is held at an angle to the chain by a pair of lugs 60. In operation the skin 44 of the animal is manually loosened from hind quarters area and inserted in a downwardly moving clamp. The skin will thereafter be pulled downwardly from the animal carcass.

Obviously many modifications and variations of the invention as hereinbefore set forth may be made without departing from the spirit and scope thereof, and therefore only such limitations should be imposed as are indicated in the appended claims.

I claim:

1. An improved apparatus for securing the skins and pelts of animal carcasses and removing said skins and pelts therefrom, said apparatus comprising: carcass holding means for initially positioning a carcass substantially vertically whereon the skin has been loosened about two leg portions; a unitary clamp for securing the two said loosened portions of skin, said clamp including, a flat back plate; upstanding edges at two opposite ends of said back plate; a pair of arms pivotally mounted to said back plate between said edges; arcuate gripping shoes attached to opposite ends of said arms, said arms and gripping shoes being openly exposed on said back plate and between said upstanding edges and positioned so that movement thereof in a given direction will move said gripping shoes toward engagement with said upstanding edges and any skin located therebetween so that said portions of skin may be inserted prior to such engagement between said shoes and edges and held against movement in said direction and said portions of skin may be removed therefrom by urging in an opposite direction; resilient means connected to said arms normally urging said gripping shoes toward contact with said upstanding edges; and power means associated with one of said carcass holding means and said clamp for moving a carcass and said clamp apart from one another so as to pull at said portions of skin in said clamp in said direction whereby said skin will be held and stripped from said carcass.

2. The apparatus of claim 1 wherein said power means is a hoist attached to the forelegs of a carcass and said clamp is attached to a stationary pedestal positioned for gripping portions of skin loosened from the forelegs of a carcass.

3. The apparatus of claim 1 wherein said power means is an endless conveyor trained to move downwardly along a run at a slight angle to a vertical adjacent a carcass suspended head down from said holding means, and said clamp is attached to said conveyor for gripping portions of skin loosened from the hind quarters of said carcass.

4. An improved apparatus for securing the skins and pelts of animal carcasses and removing said skins and pelts therefrom, said apparatus comprising: carcass holding means for initially positioning a carcass substantially vertically whereupon the skin has been loosened about two leg portions; a unitary clamp for securing the two said loosened portions of skin, said clamp including, a flat back plate; upstanding edges at two opposite ends of said back plate; a pair of arms pivotally mounted to said back plate between said edges; arcuate gripping shoes attached to opposite ends of said arms, said arms and gripping shoes being positioned so that movement thereof in a given direction will move said gripping shoes toward engagement with said upstanding edges and any skin located therebetween so that said portions of skin may be inserted prior to such engagement between said shoes and edges and held against movement in said direction and said portions of skin may be removed therefrom by urging in an opposite direction; resilient means connected to said arms normally urging said gripping shoes toward contact with said upstanding edges; and an endless conveyor trained to move downwardly along a run at a slight angle to vertical adjacent a carcass suspended head down from said holding means, and said clamp is attached to said conveyor for gripping portions of skin loosened from the hind quarters of said carcass.

References Cited by the Examiner

UNITED STATES PATENTS

| 432,539 | 7/90 | Mains | 24—134 |
|---|---|---|---|
| 536,684 | 4/95 | Creager | 24—132 |
| 1,482,268 | 1/24 | Schopper. | |
| 2,494,138 | 1/50 | De Moss | 17—21 X |

FOREIGN PATENTS 142,904  12/61  U.S.S.R.

SAMUEL KOREN, *Primary Examiner.*

LUCIE H. LAUDENSLAGER, *Examiner.*